US012235844B1

(12) United States Patent
Ghatage et al.

(10) Patent No.: US 12,235,844 B1
(45) Date of Patent: Feb. 25, 2025

(54) ANOMALOUS QUERY IDENTIFICATION USING QUERY CLUSTERING

(71) Applicant: Salesforce, Inc., San Francisco, CA (US)

(72) Inventors: Anup Ghatage, Fremont, CA (US); Colm McHugh, Dublin (IE)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/418,991

(22) Filed: Jan. 22, 2024

(51) Int. Cl.
*G06F 16/00* (2019.01)
*G06F 16/2453* (2019.01)
*G06F 16/28* (2019.01)

(52) U.S. Cl.
CPC ...... *G06F 16/24545* (2019.01); *G06F 16/285* (2019.01)

(58) Field of Classification Search
CPC .................................................. G06F 16/285
See application file for complete search history.

(56) References Cited

U.S. PATENT DOCUMENTS

| 11,509,721 B2 | 11/2022 | Ghatage et al. |
| 2012/0209847 A1* | 8/2012 | Rangan ............... G06F 16/3347 707/769 |
| 2023/0205760 A1 | 6/2023 | McHugh et al. |

* cited by examiner

*Primary Examiner* — Ajith Jacob
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to managing database queries. In some embodiments, a server system receives a query from a computer system and determines a set of aspects for the query, including at least a number of columns specified in the query and a computational cost of executing the query. The system generates a query vector based on the set of aspects determined for the query. The system then compares the query vector with a plurality of clusters, ones of the plurality of clusters comprising two or more previously generates query vectors generated based on aspects of queries previously received by the server system. Based on the comparing, specifically a distance between the query vector and the plurality of clusters of previously generated query vectors, the system classifies the query. Based on a classification of the query determined during the classifying, the system manages the query.

20 Claims, 8 Drawing Sheets

Example Queries
302
(From Same Cluster)

302A

DELETE FROM Table_1
WHERE column_1 = $1
    AND column_2 = $2

302B

DELETE FROM Table_2
WHERE column_3 = VARCHAR '1'
    AND column_4 = $1

Example Vector
Format 310

[Query Type, Table Names, Table Object Identifiers (IDs), Table Count, Column Reference Count, Query Cost Estimate, Modify Count, ..., Query Aspect N]

Example Vectors
342
(From Same Cluster)

342A

[Delete, Table_1, "Table_1", 1, 2, 30 seconds and 5 CPUs, 2, ..., Null]

342B

[Delete, Table_2, "Table_2", 1, 2, 30 seconds and 5 CPUs, 2, ..., Null]

FIG. 3

ANOMALOUS QUERY IDENTIFICATION USING QUERY CLUSTERING

BACKGROUND

Technical Field

This disclosure relates generally to database systems, and, more specifically, to database optimizations.

Description of the Related Art

When a query is submitted to a database, it may express what the result of a query should be. This result is then ingested by the system operating the database in order to determine one or more ways to execute the query (which may be done using several approaches). For example, a query requesting a join of tables A, B, and C may be executed as 1) a join of A and B followed by a join of the result and C or 2) a join of B and C followed by a join of A and the result. Modern relational database systems typically employ a query optimizer that receives a parsed query and evaluates different query execution plans to determine a plan for executing a query on the database. Such systems, however, often receive an inordinate number of queries each second, minute, day, etc., making it difficult or time-consuming for the database system to optimize the queries.

BRIEF DESCRIPTION OF THE DRAWINGS

FIG. 3 is a diagram illustrating example queries, a query vector format, and example query vectors, according to some embodiments.

DETAILED DESCRIPTION

Figure 1:
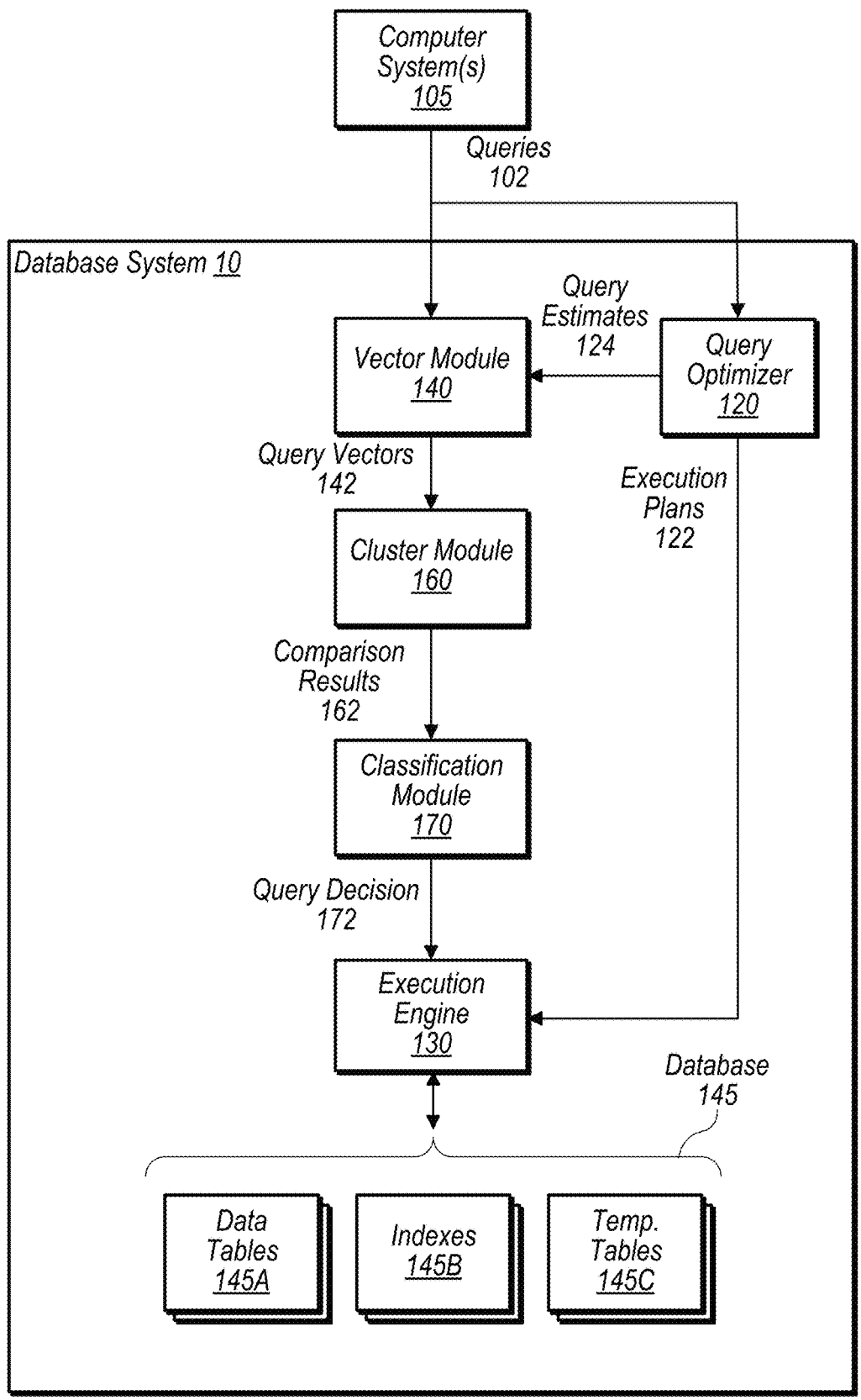
FIG. 1 is a block diagram illustrating a server system configured to classify queries according to a plurality of query aspects, according to some embodiments.

In general, database systems (e.g., Salesforce.com™) often store a vast amount of customer data and receive a vast number of queries each second, minute, day, etc. requesting to access the data. As such, these database systems often have difficulty designing and optimizing e.g., millions of queries received from different computer systems. In addition, a large number of queries often pose security risk (these queries may be received from both computer systems operated by users authorized internally to the database system and computer systems operated by users external to the database system). For example, an administrator of a database may submit a query requesting to delete a large set of data stored in the database by accident. In this example, due to the administrator having a high level of authority within the database system, this query is likely to be authorized, which causes a great loss of data. As another example, multiple similar queries are often submitted from different computer systems within a given second, minute, hour, etc. resulting in inefficient use of database system resources (i.e., the same database operations are performed on the database multiple times within a minute of one another).

To prevent undesirable queries from being executed on the database, the disclosed techniques encode and classify newly received queries using clustering techniques. Such techniques identify anomalous or suspicious queries input to a database system (e.g., Salesforce.com), which, as discussed above, may be millions of queries per minute. Classification of queries (e.g., whether a query is risky, an outlier, slow, computationally expensive, etc.) is achieved by the disclosed techniques through encoding the queries according to various characteristics of the queries and then clustering the queries (e.g., via k-means clustering) based on similarities in their encoded characteristics. Query characteristics may also be referred to herein as query "aspects." The encoding results in query vectors that each include several characteristics determined during the encoding.

The query clustering results in groupings of similar queries, with the different groupings representing commonly observed or expected queries. These clusters are used to classify new, incoming queries submitted to e.g., a web application. For example, if the vector of a new query is located outside of the various generated query clusters, then this query is likely anomalous in some way (and may be risky or even malicious). In this example, if the vector of the new query is more than a threshold distance from the various generated clusters, then the disclosed system may automatically flag this new query and perform one or more preventative actions with respect to the query.

In some situations, if the encoding of the input query is closer to a cluster made up of "risky" or "anomalous" queries, then the disclosed techniques will likely classify the input query as risky as well and may block the query altogether (or send the query for further review by an administrator). In other situations, the query may be classified as a "slow" query (based on its proximity to a cluster with a centroid query that is classified as being computationally expensive). In such situations, the query is flagged for modification or improvement and is sent back to a computer system that submitted the query for revisions.

In disclosed techniques, encoding of queries in a multi-dimensional aspect space allows for comparison of the queries at an internal level (e.g., the comparison is not warped by the syntax of the query). Generating an internal comparison of queries provides an understanding of queries which, in turn, may advantageously be used to improve database performance and security. For example, the disclosed techniques may prevent suspicious (and often malicious) queries from being executed on the database. Further, the disclosed techniques may advantageously reduce the number of queries executed on the database. As one example, given 500,000 newly submitted queries, the disclosed database system might break these queries down into 30,000 unique queries (e.g., by identifying and removing duplicates) which correspond to approximately 80 different clusters. This reduction in the number of queries approved for execution on the database further reduces the amount of storage capacity needed by the database itself (e.g., to store new data submitted in write queries).

Query Classification and Execution

Turning now to FIG. 1, a block diagram of a server system configured to classify queries according to a plurality of query aspects is depicted. In illustrated embodiment, database system 10 (one example of the server system that is configured to classify queries) includes query optimizer 120, vector module 140, cluster module 160, classification module 170, execution engine 130, and database 145. In the illustrated embodiment, database system 10 receives queries 102 from one or more computer systems 105. In some embodiments, database system 10 may be implemented differently than shown. For example, system 10 may include more components, queries 102 may be expressed using any of various syntax, query optimizer 120 may generate a single execution plan for each query, several of the components included in database system 10 (e.g., vector module 140, cluster module 160, and classification module 170) may be included in another server system—that performs the query vectorization, clustering, and classification discussed in further detail below—that transmits results generated by these components to database system 10 for input to execution engine 130, etc.

Database system 10 may correspond to any suitable database system. In some embodiments, system 10 is a relational database management system (RDBMS), which may be implemented using, for example, Oracle™, MySQL™, Microsoft™ SQL Server, PostgreSQL™, IBM™ DB2, etc. Accordingly, system 10 may be configured to store data in one or more data tables 145A for servicing queries 102. Further, system 10 may implement a database that is a distributed database have multiple distributed instances. System 10 may also maintain one or more indexes 145B usable to facilitate retrieving data from data tables 145A, and may generate one or more temporary tables 145C in response to servicing queries 102. In some embodiments, queries 102 are expressed using structured query language (SQL); in other embodiments, other query declarative languages may be supported. In some embodiments, database system 10 includes a multi-tenant database in which multiple tenants each store a respective set of data in the database, as discussed in further detail below with reference to FIG. 6. For example, the multi-tenant database may include a first set of data belonging to a non-profit organization (e.g., a first tenant) and a second set of data belonging to an individual (e.g., a second tenant). In such an embodiment, database system 10 may employ various security measures to ensure that one tenant's dataset is isolated from another's dataset in order to prevent one tenant from accessing another tenant's data.

Database system 10, in the illustrated embodiment, receives a plurality of queries 102 from one or more computer systems 105. In some embodiments, in addition to receiving queries 102 from one or more computer systems 105, database system 10 retrieves previously received queries by automatically ingesting queries from a database control logging infrastructure. For example, in addition to receiving new queries 102, database system 10 may retrieve previous queries in order to analyze query patterns via cluster module 160, as discussed in further detail below with reference to FIGS. 2 and 3. After receiving queries 102, database system 10 inputs the queries 102 to both vector module 140 and query optimizer 120.

Query optimizer 120, in the illustrated embodiment, receives queries 102 from one or more computer systems 105. Query optimizer 120, in various embodiments, is operable to generate an execution plan 122 (which may also be referred to herein as a "query plan") for a given query 102, which includes evaluating various execution plans 122 and selecting one to implement the given query 102. Query optimizer 120 may use any suitable algorithm to generate and evaluate execution plans 122. In some embodiments, query optimizer 120 may use a heuristic algorithm in which execution plans 122 are assessed based on a set of rules provided to optimizer 120. In other embodiments, optimizer 120 uses a cost-based algorithm in which optimizer 120 performs a cost analysis that includes assigning scores to execution plans 122 based on an estimated processor consumption, an estimated memory consumption, an estimated execution time, etc. These estimates may further be based on various metrics such as the number of distinct values in table columns, the selectivity of predicates (the fraction of rows the predicate would qualify), the cardinalities (e.g., row counts) of tables 140A being accessed, etc. Based on the scores, query optimizer 120 may then select an execution plan 122 that has the best score. In some embodiments, query optimizer 120 may use a combination of heuristic and cost-based algorithms.

As discussed above, in various embodiments, query optimizer 120 is further operable to evaluate execution plans 122 based on constraints (also referred to herein as query "criteria") included in a query 102 and select one or more plans 122 that comply with the constraints. For example, in some embodiments, query optimizer 120 may assign an unfavorable score to (or may not even score) any execution plan 122 that does not comply with the query constraints in order to preclude it from being selected.

In various embodiments, if query optimizer 120 is unable to select an execution plan 122 that satisfies the constraints for a given query 102, query optimizer 120 is operable to provide a corresponding indication specifying than an error has occurred. In some embodiments, this error may indicate not only that a plan 122 does not exist to satisfy constraints, but also identify the particular constraint that could not be satisfied if multiple constraints were specified in the query 102. In some embodiments, query optimizer 120 may still select an execution plan 122 (albeit one that does not comply with constraints) and provide it to execution engine 130— thus, a user may still receive results of the query, but be made aware that the results were obtained in a manner that is inconsistent with the provided constraints. In other embodiments, however, query optimizer 120 may provide an error and not select any plan 122 to implement the query 102. In the illustrated embodiment, query optimizer 120 sends one or more selected execution plans 122 to execution engine 130 for executing queries 102, as discussed in further detail below.

Query optimizer 120, in the illustrated embodiment, sends query estimates 124 to vector module 140. Query estimates 124 indicate an amount of time and an amount of computational resources required to execute different queries 102 according to an execution plan 122 determined by query optimizer 120 for the queries 102. For example, query optimizer 120 may send a query estimate 124 for a given query 102 to vector module 140 that indicates this plan will take a given number of seconds to execute when utilizing a given amount of resources. In some embodiments, query optimizer 120 sends two different query estimates 124 for two different execution plans 122 for a single query 102. In other embodiments, query optimizer 120 sends a query estimate 124 for a single execution plan 122 for each query 102 provided to vector module 140. Query optimizer 120 generates these query estimates 124 by estimating a total number of tuples or rows (or both) required by a query execution plan 122 selected for a given query 102 and a cost of processing each of the tuples and rows. Query optimizer 120 may generate estimates 124 by estimating any of various metrics. When determining which of a plurality of query plans to execute for a given query, query optimizer 120 estimates the cost as well as various other metrics for each of the plurality of query plans. As such, query optimizer 120 is able to provide these metrics (query estimates 124) to vector module 140 for use in encoding query aspects.

Vector module 140, in the illustrated embodiment, receives queries 102 from one or more computer systems 105 and query estimates 124 from query optimizer 120. In various embodiments, vector module 140 generates query vectors 142 for queries 102. Vector module 140 determines a set of aspects for each query 102 received from computer system(s) 105 and uses the set of aspects to generate query vectors 142. For example, vector module 140 may determine the following set of aspects for a given query 102: a number of columns specified in the query, a computational cost of executing the query, a number of tables specified in the query, a number of modifications specified in the query, a query type for the query, one or more table object identifiers referenced in the query, etc. Determination of query aspects is discussed in further detail below with reference to FIG. 2. Vector module 140, in the illustrated embodiment, sends query vectors 142 to cluster module 160.

Cluster module 160, in various embodiments, generates clusters of query vectors generated for previously received queries and compares the query vectors 142 for current queries 102 with the clusters. For example, the clusters of previously received queries indicate patterns of commonly received queries. In various situations, if a query vector 142 for a current query is far from the clusters of previously received queries in the vector space, then the query corresponding to this vector is likely anomalous in some way (e.g., could be a risky query). As discussed in further detail below with reference to FIG. 2, cluster module 160 utilizes one or more clustering algorithms to generate the plurality of clusters. After comparing a query vector 142 for a current query 102 with the clusters of vectors corresponding to previously received queries, cluster module 160 sends comparison results 162 to classification module 170. Comparison results 162 may indicate a similarity between a query vector for a current query and query vectors of previously received queries. For example, if a distance between the query vector for the current query 102 and the clusters of query vectors for previously received queries is larger than a distance threshold requirement, then the current query 102 is not similar to the previously submitted queries.

Classification module 170, in the illustrated embodiment, receives comparison results 162 from cluster module 160. Classification module 170 assigns a classification to a current query 102 corresponding to the comparison results. In the illustrated embodiment, classification module 170 generates and sends a query decision 172 (which is generated based on the classification of the current query 102). For example, query decision 172 indicates whether the current query 102 is to be executed by execution engine 130 based on an execution plan 122 corresponding to the current query. Processing query decisions 172 for queries 102 is discussed in further detail below with reference to FIG. 5.

Execution engine 130, in various embodiments, is operable to execute a selected execution plan 122 based on a query decision 172 received from classification module 170 for a query 102 for which the execution plan 122 was generated. Accordingly, engine 130 may perform the various actions listed in the execution plan 122, which may include accessing one or more data tables 145A, indexes 145B, or temporary tables 145C. Engine 130 may then return any results to service query 102. For example, execution engine 130 may cause the results of the executed query plan to be transmitted to one of computer systems 105. In some embodiments, execution engine 130 does not perform an execution plan 122. For example, if a query decision 172 indicates that a query corresponding to the plan should be rejected, execution engine 130 will not perform the execution plan 122 for this query. In some situations, execution engine 130 and query optimizer 120 may also be referred to as "modules."

In this disclosure, various "modules" operable to perform designated functions are shown in the figures and described in detail (e.g., database statistics module 140, selector module 150, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

Example Vectorization and Clustering

Figure 2:
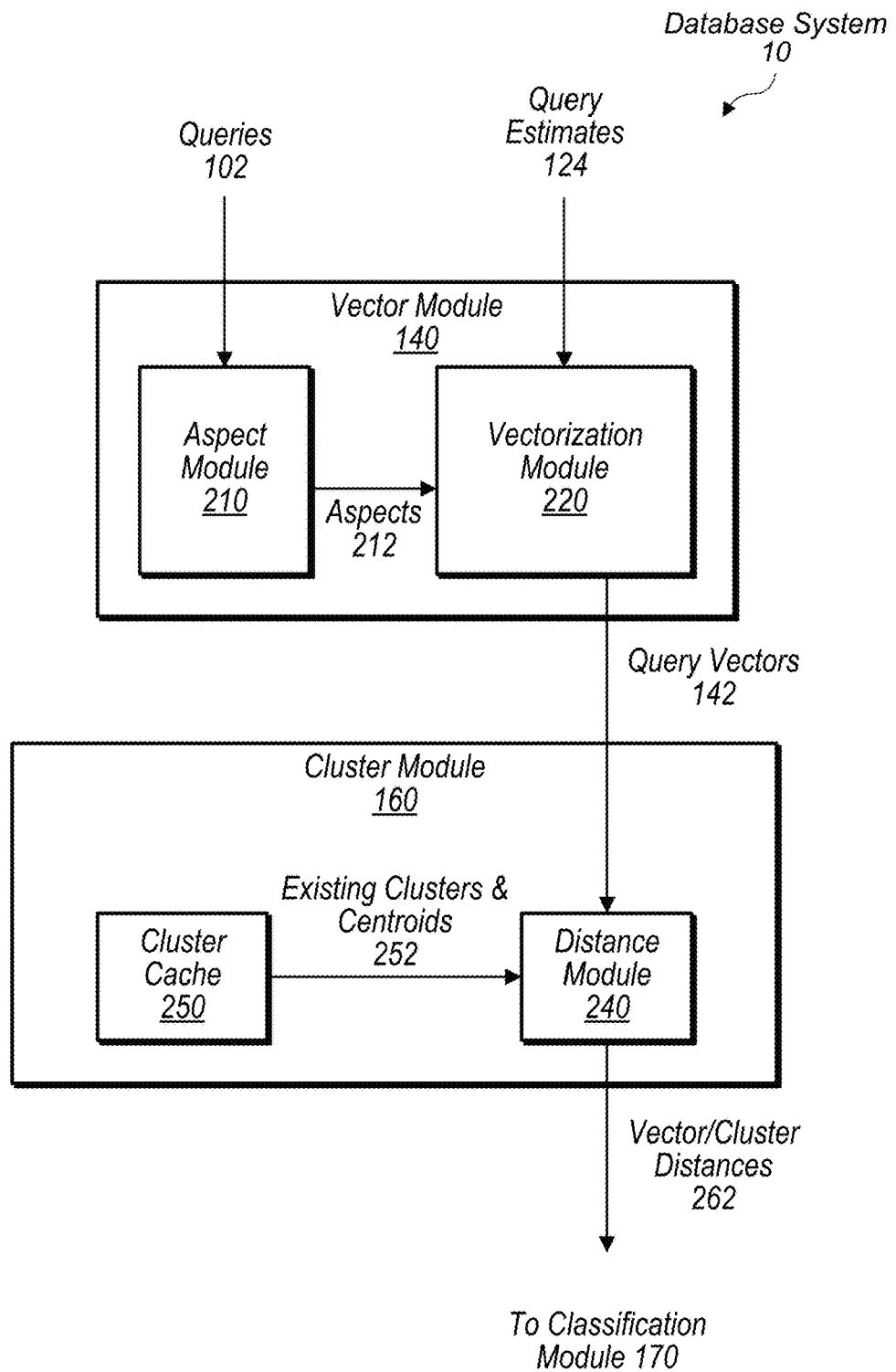
FIG. 2 is a block diagram illustrating example vector and cluster modules, according to some embodiments.

Turning now to FIG. 2, a diagram of example vector and cluster modules is depicted. In FIG. 2, detailed versions of vector module 140 and cluster module 160 are shown. For example, vector module 140 includes an aspect module 210 and vectorization module 220, while cluster module 160 includes a cluster cache 250 and a distance module 240.

Aspect module 210, in the illustrated embodiment, receives queries 102 and identifies a plurality of aspects 212 for each query. For example, aspect module 210 identifies two or more of the following aspects for each query: a number of columns specified in the query, a number of tables specified in the query, a number of modifications specified in the query, a query type for the query, one or more table object identifiers referenced in the query, a number of joins specified in the query, a number of scans specified in the query, one or more sub-queries included in the query, a number of operator nodes in the query, etc. Aspect module 210, in the illustrated embodiment, provides different sets of aspects 212 for queries 102 to vectorization module 220.

Vectorization module 220, in the illustrated embodiment, receives query estimates 124 (from query optimizer 120 shown in FIG. 1) and aspects 212 from aspect module 210. Vectorization module 220, in various embodiments, generates query vectors 142 for each of queries 102 based on the aspects 212 and query estimates 124. For example, query estimates 124 for each query 102 specify a computational cost of executing the query as well as an amount of time needed to execute the query. Vectorization module 220 selects one or more of the aspects 212 for a given query 102 as well as the query estimates 124 and encodes these values in a vector to generate a query vector 142 for the given query 102. In some embodiments, vectorization module 220 places all of the values of the aspects 212 and query estimates 124 in a query vector 142 for a given query. In other embodiments, vectorization module 220 selects only a subset of the aspects and query estimates 124 for inclusion in query vectors 142.

Cluster module 160, in the illustrated embodiment, manages cluster cache 250, which stores clusters that were previously generated by cluster module 160 based on a plurality of query vectors for previously submitted queries. For example, cluster module 160 retrieves a plurality of previously received queries from a database (e.g., database 145) and generates a plurality of clusters based on the previously received queries. In this example, cluster module 160 then stores the clusters in cluster cache 250 for later use. Further in this example, cluster module 160 identifies different query vectors that are located at a "center" of each cluster and assigns these vectors as centroids of each cluster. This type of clustering is referred to as centroid clustering. In other situations, cluster module 160 implements other types of clustering, including density-based clustering or distribution-based clustering. In some embodiments, the clustering performed by cluster module 160 is k-means clustering. In various embodiments, the clustering is performed by cluster module 160 using one or more of the following: density-based spatial clustering of application with noise (DBSCAN), hierarchical clustering, spectral clustering, etc.

Distance module 240, in the illustrated embodiment, retrieves existing clusters and centroids 252 from cluster cache 250. Distance module 240 determines distances between query vectors 142 for current queries and centroids 252 of clusters retrieved from cluster cache 250. In some embodiments, distance module 240 executes a distance measuring algorithm to determine a distance between a given query vector 142 and one or more centroids 252 of clusters retrieved from cluster cache 250. Distance module 240 executes one or more of the following types of distance measuring algorithms: Euclidean distance (e.g., determining the square root of the sum of the squared differences between two vectors), cosine similarity (e.g., determining the dot product of two vectors divided by the product of the norm of the two vectors), or inner product (e.g., multiplying each dimension with a corresponding dimension of the other vector and summing the products). After determining distances between a query vector of a current query and one or more centroids, distance module 240 transmits the distances 262 to classification module 170. Classification module 170 classifies the query vector based on the measured distances, as discussed in further detail below with reference to FIG. 5.

Turning now to FIG. 3, a diagram illustrating example queries 302, a query vector format 310, and example query vectors 342 is depicted. The example queries 302 shown in FIG. 3 include two different queries 302A and 302B with different tables and columns referenced in the queries, but with the same general query structure. In the disclosed techniques, database system 10 (via cluster module 160 and classification module 140) places both query 302A and query 302B in the same cluster due to their similar structure. For example, the two example queries 302 have similar query vectors 342A and 342B, as shown at the bottom portion of FIG. 3. Example query 302A includes the following three criteria: "DELETE FROM table_1," "WHERE column_1=$1," "AND column_2=$2." Similarly, example query 302B includes the same three conditional criteria, but for different tables and columns: "DELETE FROM table_2," "WHERE column_3=VARCHAR '1'," "AND column_4=$1."

In FIG. 3, an example vector format 310 is shown with the following entries within the query vector: [query type, table names, table object identifiers (IDs), table count, column reference count, query cost estimate, modify count, . . . , query aspect N]. Note that the list of aspect values included in query vector format 310 is not an exhaustive list and that other query aspects may be included in a query vector. The "query aspect N" entry in query format 310 indicates that any number of query aspects may be included in a query vectors. For example, query vectors might include ten or more aspects from their corresponding queries.

Two example query vectors 342, that are generated (by vector module 140 shown in FIGS. 1 and 2) for the two queries 302A and 302B and are assigned to the same cluster, are shown at the bottom portion of FIG. 3. For example, query vector 342A that is generated for query 302A includes the following values: [delete, Table_1, "Table_1", 1, 2, 30 seconds and 5 CPUs, 2, . . . , null]. The example query vector 342B that is generated for query 302B includes the following values: [delete, Table_2, "Table_2", 1, 2, 30 seconds and 5 CPUs, 2, . . . , null]. In this example and as discussed above, while these two queries 302 reference different tables and columns, they have very similar query vectors 342 and, thus, are added to the same cluster (e.g., by cluster module 160).

In some embodiments, queries that are visually different and reference different tables and columns, but have a similar multi-dimensional aspect space (i.e., have similar query vectors) are grouped together in the same cluster. For example, if example queries 302 were to appear visually different (e.g., have different modification actions, such as one having "READ FROM" instead of "DELETE FROM"), but still have similar query vectors, then these queries will still be grouped in the same cluster within the multi-dimensional aspect space. In some situations, queries that are visually similar, but have different multi-dimensional aspect spaces will not be in the same cluster.

Figure 4:
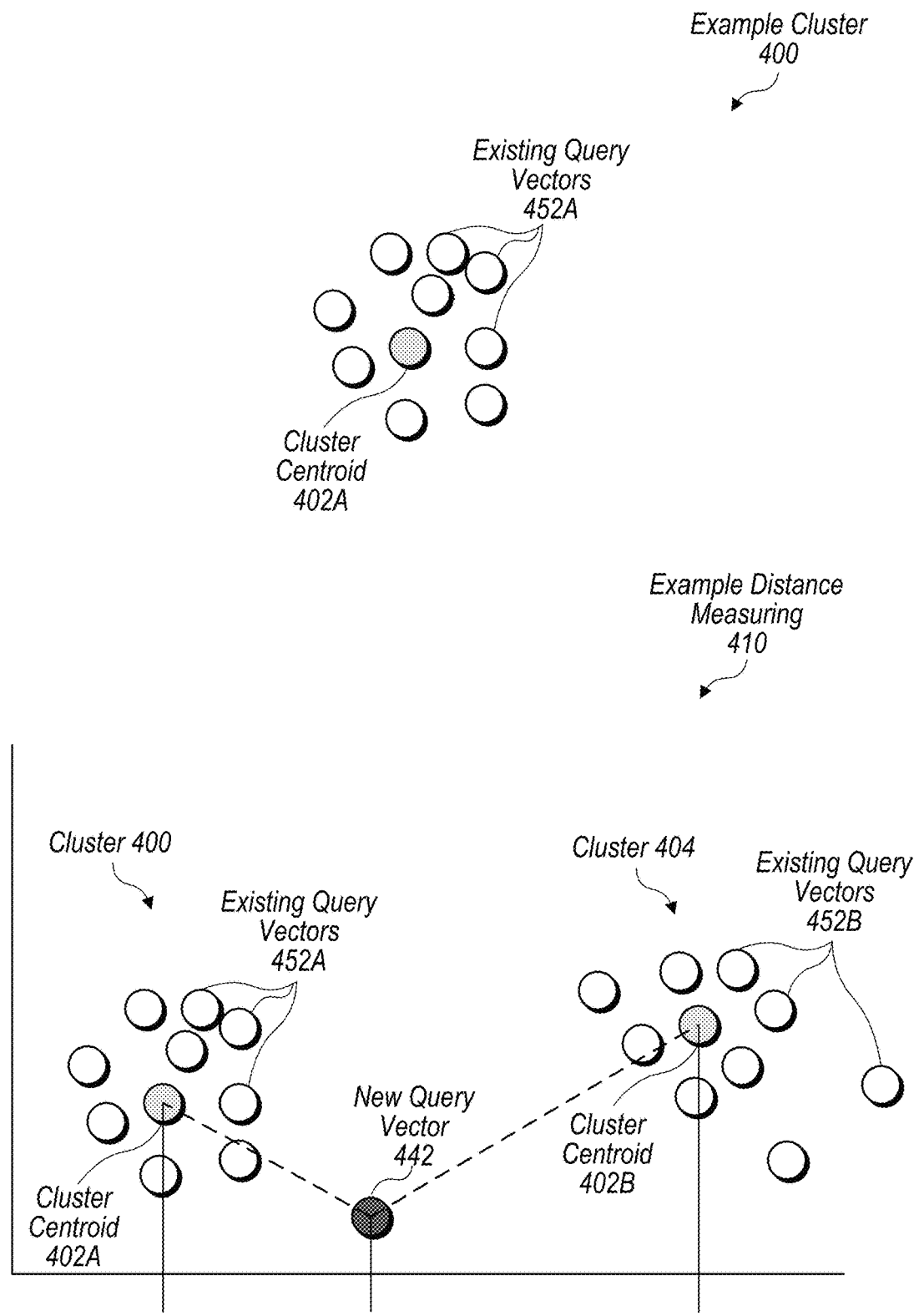
FIG. 4 is a diagram illustrating an example cluster and example distance measuring between a query vector and two different clusters, according to some embodiments.

FIG. 4 is a diagram illustrating an example cluster and example distance measuring between a query vector and two different clusters. In the illustrated embodiment, the example cluster 400 shown at the top portion of the figure includes ten different query vectors 452A, with one of the query vectors being a centroid 402A assigned to the cluster 400. In this example, cluster module 160 (shown in FIGS. 1 and 2) generates cluster 400—or retrieves the cluster from cluster cache 250—based on existing query vectors 452A and assigns centroid 402A as the "center point" of the cluster 400. For example, cluster module 160 selects centroid 402A based on summing the positions of each query vector within cluster 400 and dividing the sum by the number of query vectors included in cluster 400. In this example, the quotient indicates a location (e.g., a point) within cluster 400. Cluster module 160 assigns the query vector in the cluster that is closest to the location indicated by the quotient as the centroid (i.e., 402A).

An example of distance measuring 410 is shown in the bottom portion of FIG. 4. In the example distance measuring 410, two different clusters are shown, cluster 400 (also shown in the top portion of FIG. 4) and another cluster 404 made up of existing query vectors 452B. In this example, distance module 240 (shown in FIG. 2) determines distances between a new query vector 442 and cluster centroids 402A and 402B. The example distance measuring 410 shown in FIG. 4 illustrates a first line between centroid 402A and vector 442 and second line between centroid 402B and vector 442. These lines show the shortest distance between query vector 442 and the query vectors of centroids 402A and 402B, respectively, within the multi-dimensional query aspect space. The distance measuring illustrated in FIG. 4 is performed using a Euclidean distance measuring technique.

Example distance measuring 410 illustrates that new query vector 442 is closer to the centroid 402A of cluster 400 than it is to the centroid 402B of other cluster 404 shown in FIG. 4. As such, in this example, classification module 170 (shown in FIG. 1) is likely to assign the query corresponding to vector 442 to cluster 400, as discussed in further detail below with reference to FIG. 5. For example, classification module 170 will assign a classification or label associated with cluster 400 to the query corresponding to vector 442. If, however, query vector 442 is not close to the centroid of either cluster, then classification module 170 is likely to label the query corresponding to vector 442 as anomalous (e.g., to indicate that this query may be suspicious or risky in some way).

In some embodiments, if a query vector falls within a "gray area" that exists between two threshold distance requirements, then the query for this vector is classified differently than a query whose vector is either very close to or very far from a cluster centroid. For example, as discussed in further detail below with reference to FIG. 5, queries whose vectors fall within the "gray area" of the multi-dimensional aspect space may be classified differently such that these queries require and trigger different types of preventative actions than queries whose vectors are close to or far from centroids of clusters within the multi-dimensional aspect space.

In some situations, after determining that new query vector 442 is closer to cluster 400 (i.e., closer to centroid 402A than centroid 402B), cluster module 160 adds query vector 442 to cluster 400. In this way, new query vector 442 alters the cluster 400, which may be used for future query evaluations. In addition, cluster module 160 may update cluster 400 by determining whether centroid 402A is still located at the center of cluster 400. If centroid 402A is no longer located near the center of cluster 400, cluster module 160 determines and assigns a different query vector within cluster 400 as the centroid instead of centroid 402A.

Exemplary Classification

Figure 5:
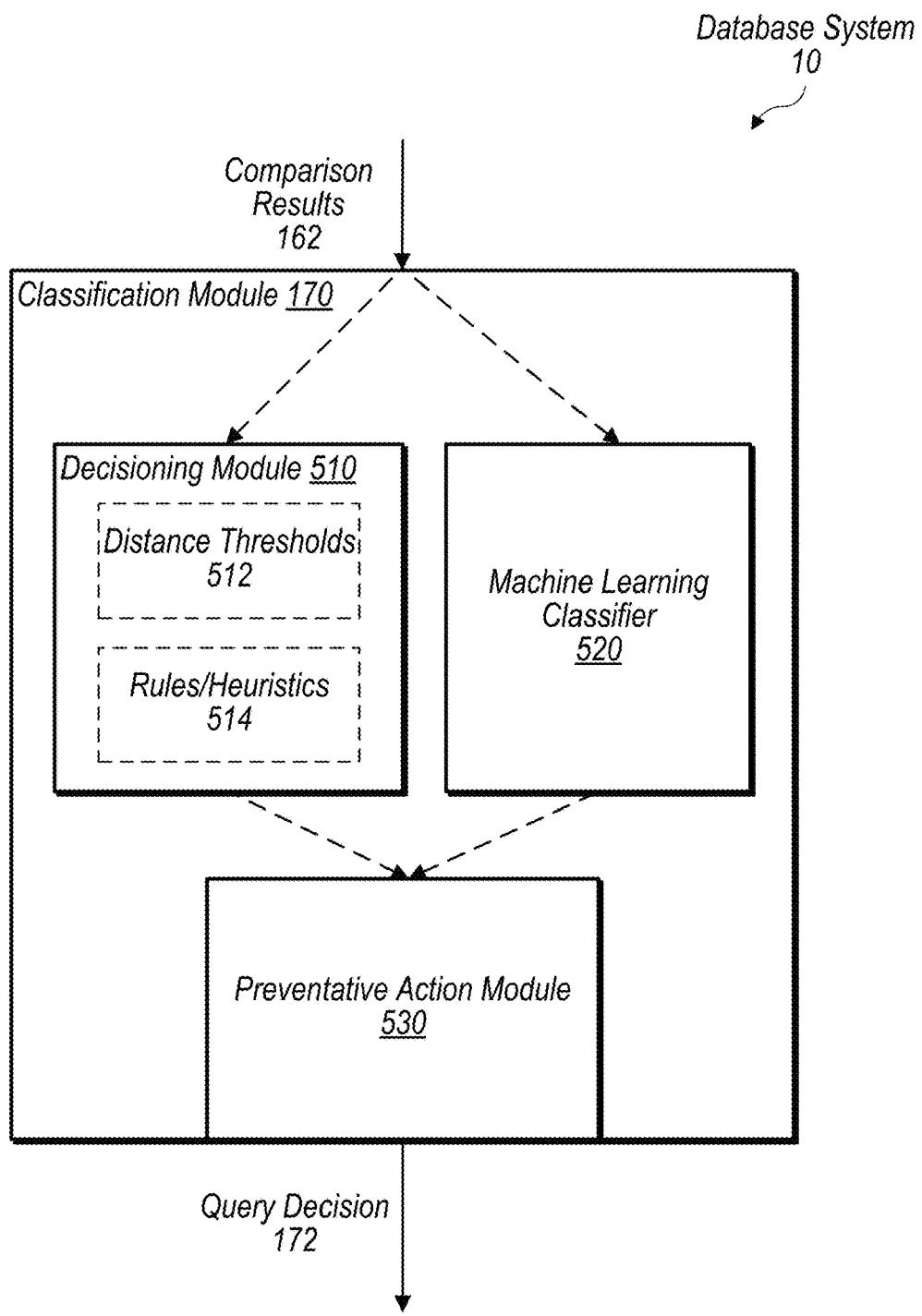
FIG. 5 is a block diagram illustrating an example classification module, according to some embodiments.

Turning now to FIG. 5, a diagram illustrating an example classification module is depicted. In the illustrated embodiment, classification module 170 includes decisioning module 510, machine learning classifier 520, and preventative action module 530. In the illustrated embodiments, classification module 170 receives comparison results 162 (from cluster module 160 as shown in FIG. 1) and outputs a query decision 172 for a query 102. In the illustrated embodiment, classification module 170 executes one or both of decisioning module 510 and machine learning classifier 520 to determine a classification for a query 102 corresponding to comparison results 162. For example, sometimes classification module 170 executes only decisioning module 510 for a query 102. In other situations, classification module 170 executes only machine learning classifier 520. In still other situations, classification module 170 executes both module 510 and classifier 520 and compares results of the two different executions.

Decision module 510, in the illustrated embodiment, receives comparison results 162, which include one or more distances measured by distance module 240 shown in FIG. 2, and compares the distances with one or more distance thresholds 512. For example, decision module 510 compares the distances measured in FIG. 4 between new query vector 442 and centroids 402A and 402B with distance thresholds 512. In this example, decisioning module 510 determines that the distance between new query vector 442 and centroid 402A is less than a distance threshold 512 requirement. Based comparing this distance with one or more rules or heuristics 514, decisioning module 510 assigns a classification to the query corresponding to vector 442 (or to the vector 442 itself). The rules and heuristics 514 may specify, for example, that if a distance measurement included in comparison results 162 is below a first distance threshold 512, then the query vector corresponding to the results 162 is not anomalous (this is a normal, expected query) and decisioning module 530 labels the vector accordingly. Decisioning module 510 inputs the classification for the query to preventative action module 530, as shown in the illustrated example.

In various embodiments, cluster module 160 may generate clusters from previously received queries that are classified as non-optimal queries. For example, cluster module 160 may generate clusters from a training set of queries that includes slow queries, anomalous queries, etc. In this example, when comparing a new query to clusters generated using non-optimal queries, decisioning module 510 may classify query vectors that are close to these clusters as anomalous; query vectors that are not close to any of the clusters may be classified as not anomalous.

Machine learning classifier 520, in the illustrated embodiment, receives comparison results 162 that include distances between a query vector and one or more centroids of clusters and outputs a classification for the query vector based on the input distances. Machine learning classifier 520 is, for example, one or more of the following types of machine learning models: a neural network, a logistic regression classifier, a random forest classifier, a linear regression classifier, etc. The classification output by machine learning classifier 520 (and input to preventative action module 530) indicates one or more of the following classifications for the query vector: non-anomalous query, anomalous query, gray area query (e.g., when the vector is neither close to or far from any given cluster), unknown query, slow query, security risk query, duplicate query, etc.

Preventative action module 530, in the illustrated embodiment, receives output from either decisioning module 510 or machine learning classifier 520 or both. Based on the received output, preventative action module 530 generates a query decision 172 indicating at least whether execution engine 130 should execute a newly received query 102. Said another way, query decision 172 indicates how a newly received query 102 should be managed. In embodiments in which preventative action module 530 receives output from both module 510 and classifier 520, module 530 compares the two outputs before making a query decision 172. Query decision 172, as one example, may indicate that a query is rejected, is approved (and executed), requires additional authentication or approvals, requires revision, requires additional review, requires deduplication, etc. For example, preventative action module 530 determines that two queries are duplicates of one another if the distance within a cluster between the query vectors of these queries is 0. In this example, preventative action module 530 outputs a query decision 172 indicating that only one of the queries should be executed (to avoid wasting time and computing resources on executing the same query twice).

In addition to generating query decision 172, in various embodiments, preventative action module 530 generates and performs one or more preventative actions relative to the query decision 172. For example, if query decision 172 indicates that a given query requires additional authentication or approvals, then preventative action module 530 performs preventative actions such as sending a request for authentication (e.g., one or more authentication factors) to a computer system 105 that submitted the given query. As another example, preventative action module 530 may cancel a query based on the query decision 172 indicating that this is an anomalous query. In this example, preventative action module 530 may transmit a notification to a system administrator indicating that a query is anomalous and the system administrator may manually cancel the query. This type of preventative action may be helpful in situations in which a query generated by a new system application on new schema changes appears to be "different" than (e.g., far away from) existing queries. In such situations, while the query is not anomalous, it may appear so based on the new schema and, thus, will likely be classified as anomalous by the disclosed system; however, since this query is not, in fact, anomalous, sending the query for review by a system administrator keeps the query from being canceled altogether (e.g., the administrator approves the query for execution after receiving an alert from preventative action module 530).

Exemplary Method

Figure 6:
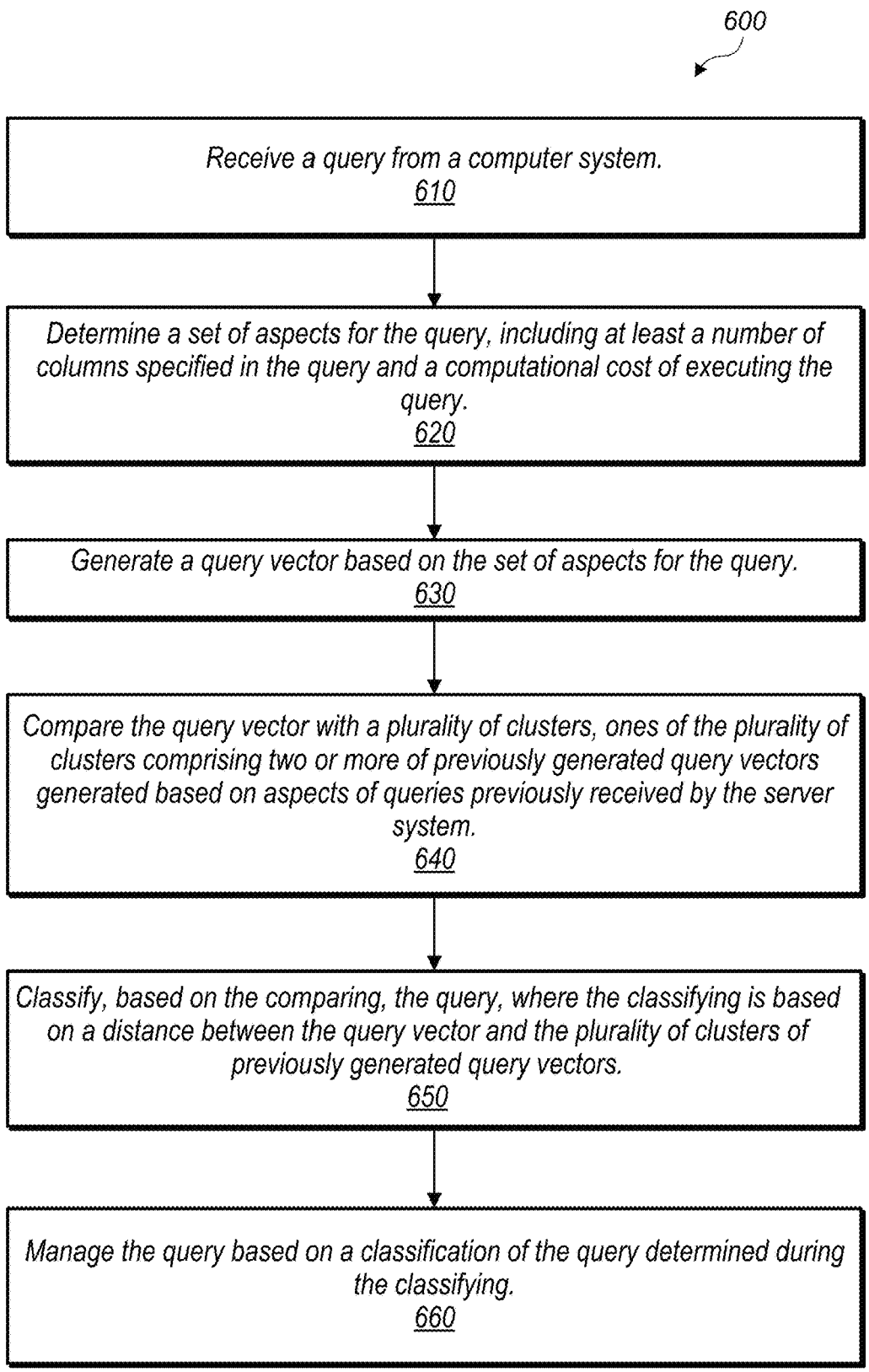
FIG. 6 is a flow diagram illustrating a method for classifying queries, according to some embodiments.

FIG. 6 is a flow diagram illustrating an example method for classifying queries, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In one embodiment, method 600 is performed by a query optimizer of a database capable of receiving optimizer constraints such as a database implemented by database system 10. In some instances, performance of method 600 allows for better execution plans to be potentially selected relative to previous query plan evaluation and selection techniques.

Method 600 begins at element 610 with a server system receives a query from a computer system. In some embodiments, prior to receiving the query from the computer system, the server system generates, for a plurality of previously received queries, a plurality of query vectors, wherein generating the plurality of query vectors includes identifying two or more aspects for respective queries. In some embodiments, prior to receiving the query from the computer system, the server system further performs a clustering operation on the plurality of query vectors, wherein output of the clustering operation is a plurality of clusters of two or more of the plurality of query vectors representing the plurality of previously received queries. In some embodiments, the server system further assigns query encodings located at the center of ones of the plurality of clusters as centroids of their respective cluster.

At element 620, the server system determines a set of aspects for the query, including at least a number of columns specified in the query and a computational cost of executing the query. In some embodiments, the server determines one or more additional aspects for the set of aspects for the query including: a number of tables specified in the query, a number of modifications specified in the query, a number of columns specified in the query, a computational cost of executing the query, a query type for the query, and one or more table object identifiers referenced in the query.

At element 630, the server system generates a query vector based on the set of aspects for the query. In some embodiments, the query vector includes the same number of values as the number of aspects included in the set of aspects for the query. In other embodiments, the query vector includes values corresponding to only a subset of the set of aspects.

At element 640, the server system compares the query vector with a plurality of clusters, ones of the plurality of clusters comprising two or more of previously generated query vectors generated based on aspects of queries previously received by the server system.

At element 650, the server system classifies the query based on the comparing, where the classifying is based on a distance between the query vector and the plurality of clusters of previously generated query vectors. In some embodiments, the distance between the query vector and the plurality of clusters of previously generated query vectors is determine by measuring a Euclidean distance between the query vector and centroids of respective clusters of the plurality of clusters of previously generated query. In some embodiments, the classifying includes assigning an anomalous classification to the query received from the computer system based on the query vector having a distance from the plurality of clusters that is greater that a distance threshold requirement. For example, if the distance between the query vector and the centroid of the closest cluster is greater than or equal to a distance threshold requirement, then the query corresponding to the query vector is likely anomalous in some way (e.g., this query is suspicious and potentially harmful). In this example, the distance between the query vector and the centroid might be three inches, while the distance threshold requirement might be two inches.

In some embodiments, the server system determines the distance between the query vector and the plurality of clusters of previously generated query vectors by measuring, using cosine similarity, a distance between the query vector and centroids of respective clusters of the plurality of clusters of previously generated query. In some embodiments, the server system determines the distance between the query vector and the plurality of clusters of previously generated query vectors by measuring, using an inner product algorithm, a distance between the query vector and centroids of respective clusters of the plurality of clusters of previously generated query.

At element 660, the server system manages the query based on a classification of the query determined during the classifying. In some embodiments, managing the query based on the classification of the query includes transmitting, by the server system to a computing system, an alert for the query, where the alert specifies the classification of the query and one or more preventative actions for the query. In some embodiments, the managing includes rejecting the query received from the computer system, including transmitting a notification to the computer system indicating that the query is not authorized. In some embodiments, the managing includes transmitting, to the computer system, a request for one or more authentication factors. In some embodiments, the managing includes determining whether to execute the query based on based on a response received from the computer system for the one or more authentication factors.

In some embodiments, the managing includes transmitting, to the computer system, a request for one or more authentication factors. In some embodiments, the managing includes rejecting, based on a response from the computer system to the request for one or more authentication factors, the query. In some embodiments, the managing includes escalating one or more preventative actions based on the distance between the query vector and the plurality of clusters of previously generated query vectors, where the escalating includes performing more restrictive preventative actions for the query vector that is a greater distance from one or more of the plurality of clusters than preventative actions performed for a query vector that is a smaller distance from one or more of the plurality of clusters. In some embodiments, the managing includes transmitting, to the computer system from which the query was received, a notification requesting alteration of the query, where the notification specifies one or more deficiencies of the query corresponding to the requested alteration.

In some embodiments, the managing includes deduplicating queries based on their classifications indicating that they perform the same operations (even if they are not identical queries). This may advantageously improve the performance of the disclosed database system by reducing the amount of computing resources necessary to execute queries (the system is not wasting resources on executing the same query twice) and reducing or preventing database errors that would result from implementing duplicate queries.

Exemplary Multi-Tenant Database System

Figure 7:
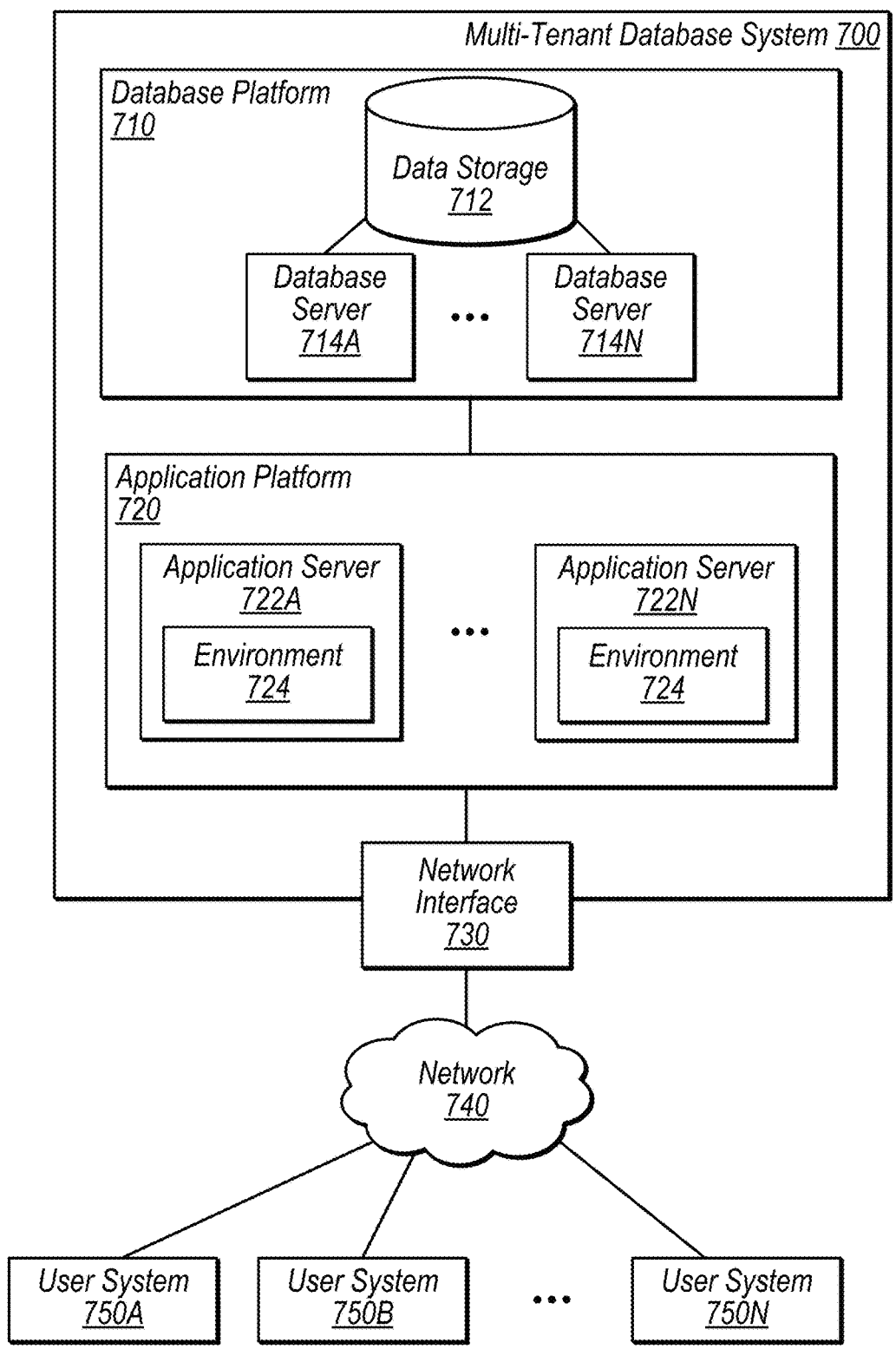
FIG. 7 is a block diagram illustrating elements of a multi-tenant system, according to some embodiments.

Turning now to FIG. 7, an exemplary multi-tenant database system (MTS) 700 in which various techniques of the present disclosure can be implemented is shown—e.g., database system 10 may be MTS 700. In FIG. 7, MTS 700 includes a database platform 710, an application platform 720, and a network interface 730 connected to a network 740. Also as shown, database platform 710 includes a data storage 712 and a set of database servers 714A-N that interact with data storage 712, and application platform 720 includes a set of application servers 722A-N having respective environments 724. In the illustrated embodiment, MTS 700 is connected to various user systems 750A-N through network 740. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 700, in various embodiments, is a set of computer systems that together provide various services to users (alternatively referred to as "tenants") that interact with MTS 700. In some embodiments, MTS 700 implements a customer relationship management (CRM) system that provides a mechanism for tenants (e.g., companies, government bodies, etc.) to manage their relationships and interactions with customers and potential customers. For example, MTS 700 might enable tenants to store customer contact information (e.g., a customer's website, email address, telephone number, and social media data), identify opportunities, record service issues, and manage marketing campaigns. MTS 700 may also enable those tenants to identify how customers have been communicated with, what the customers have bought, when the customers last purchased items, and what the customers paid. To provide the services of a CRM system and/or other services, as shown, MTS 700 includes a database platform 710 and an application platform 720.

Database platform 710, in various embodiments, is a combination of hardware elements and software routines that implement database services for storing and managing data of MTS 700, including tenant data. As shown, database platform 710 includes data storage 712. Data storage 712, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 712 is used to implement a database (e.g., database 145) comprising a collection of information that is organized in a way that allows for access, storage, and manipulation of the information. Data storage 712 may implement a single database, a distributed database, a collection of distributed databases, a database with redundant online or offline backups or other redundancies, etc. As part of implementing the database, data storage 712 may store files that include one or more database records having respective data payloads (e.g., values for fields of a database table, such as data table 145A shown in FIG. 1) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record, therefore, for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 700 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that the one tenant does not have access to another tenant's data, unless such data is expressly shared.

In some embodiments, the data stored at data storage 712 is organized as part of a log-structured merge-tree (LSM tree). An LSM tree normally includes two high-level components: an in-memory buffer and a persistent storage. In operation, a database server 714 may initially write database records into a local in-memory buffer before later flushing those records to the persistent storage (e.g., data storage 712). As part of flushing database records, the database server 714 may write the database records into new files that are included in a "top" level of the LSM tree. Over time, the database records may be rewritten by database servers 714 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 712.

When a database server 714 wishes to access a database record for a particular key, the database server 714 may traverse the different levels of the LSM tree for files that potentially include a database record for that particular key. If the database server 714 determines that a file may include a relevant database record, the database server 714 may fetch the file from data storage 712 into a memory of the database server 714. The database server 714 may then check the fetched file for a database record having the particular key. In various embodiments, database records are immutable once written to data storage 712. Accordingly, if the database server 714 wishes to modify the value of a row of a table (which may be identified from the accessed database record), the database server 714 writes out a new database record to the top level of the LSM tree. Over time, that database record is merged down the levels of the LSM tree. Accordingly, the LSM tree may store various database records for a database key where the older database records for that key are located in lower levels of the LSM tree than newer database records.

Database servers 714, in various embodiments, are hardware elements, software routines, or a combination thereof capable of providing database services, such as data storage, data retrieval, and/or data manipulation. A database server 714 may correspond to one of a plurality of database nodes included in a database system (e.g., database system 10). Such database services may be provided by database servers 714 to components (e.g., application servers 722) within MTS 700 and to components external to MTS 700. As an example, a database server 714 may receive a database transaction request from an application server 722 that is requesting data to be written to or read from data storage 712. The database transaction request may specify an SQL SELECT command to select one or more rows from one or more database tables. The contents of a row may be defined in a database record and thus database server 714 may locate and return one or more database records that correspond to the selected one or more table rows. In various cases, the database transaction request may instruct database server 714 to write one or more database records for the LSM tree—database servers 714 maintain the LSM tree implemented on database platform 710. In some embodiments, database servers 714 implement a relational database management system (RDMS) or object-oriented database management system (OODBMS) that facilitates storage and retrieval of information against data storage 712. In various cases, database servers 714 may communicate with each other to facilitate the processing of transactions. For example, database server 714A may communicate with database server 714N to determine if database server 714N has written a database record into its in-memory buffer for a particular key.

Application platform 720, in various embodiments, is a combination of hardware elements and software routines that implement and execute CRM software applications as well as provide related data, code, forms, web pages and other information to and from user systems 750 and store related data, objects, web page content, and other tenant information via database platform 710. In order to facilitate these services, in various embodiments, application platform 720 communicates with database platform 710 to store, access, and manipulate data. In some instances, application platform 720 may communicate with database platform 710 via different network connections. For example, one application server 722 may be coupled via a local area network and another application server 722 may be coupled via a direct network link. Transfer Control Protocol and Internet Protocol (TCP/IP) are exemplary protocols for communicating between application platform 720 and database platform 710; however, it will be apparent to those skilled in the art that other transport protocols may be used depending on the network interconnect used.

Application servers 722, in various embodiments, are hardware elements, software routines, or a combination thereof capable of providing services of application platform 720, including processing requests received from tenants of MTS 700. Application servers 722, in various embodiments, can spawn environments 724 that are usable for various purposes, such as providing functionality for developers to develop, execute, and manage applications (e.g., business logic). Data may be transferred into an environment 724 from another environment 724 and/or from database platform 710. In some cases, environments 724 cannot access data from other environments 724 unless such data is expressly shared. In some embodiments, multiple environments 724 can be associated with a single tenant.

Application platform 720 may provide user systems 750 access to multiple, different hosted (standard and/or custom) applications, including a CRM application and/or applications developed by tenants. In various embodiments, application platform 720 may manage creation of the applications, testing of the applications, storage of the applications into database objects at data storage 712, execution of the applications in an environment 724 (e.g., a virtual machine of a process space), or any combination thereof. In some embodiments, application platform 720 may add and remove application servers 722 from a server pool at any time for any reason, there may be no server affinity for a user and/or organization to a specific application server 722. In some embodiments, an interface system (not shown) implementing a load balancing function (e.g., an F5 Big-IP load balancer) is located between the application servers 722 and the user systems 750 and is configured to distribute requests to the application servers 722. In some embodiments, the load balancer uses a least connections algorithm to route user requests to the application servers 722. Other examples of load balancing algorithms, such as round robin and observed response time, also can be used. For example, in certain embodiments, three consecutive requests from the same user could hit three different servers 722, and three requests from different users could hit the same server 722.

In some embodiments, MTS 700 provides security mechanisms, such as encryption, to keep each tenant's data separate unless the data is shared. If more than one server 714 or 722 is used, they may be located in close proximity to one another (e.g., in a server farm located in a single building or campus), or they may be distributed at locations remote from one another (e.g., one or more servers 714 located in city A and one or more servers 722 located in city B). Accordingly, MTS 700 may include one or more logically and/or physically connected servers distributed locally or across one or more geographic locations.

One or more users (e.g., via user systems 750) may interact with MTS 700 via network 740. User system 750 may correspond to, for example, a tenant of MTS 700, a provider (e.g., an administrator) of MTS 700, or a third party. Each user system 750 may be a desktop personal computer, workstation, laptop, PDA, cell phone, or any Wireless Access Protocol (WAP) enabled device or any other computing device capable of interfacing directly or indirectly to the Internet or other network connection. User system 750 may include dedicated hardware configured to interface with MTS 700 over network 740. User system 750 may execute a graphical user interface (GUI) corresponding to MTS 700, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 750 to access, process, and view information and pages available to it from MTS 700 over network 740. Each user system 750 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 700 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 750 may be users in differing capacities, the capacity of a particular user system 750 might be determined based on one or more permission levels associated with the current user. For example, when a user is using a particular user system 750 to interact with MTS 700, that user system 750 may have capacities (e.g., user privileges) allotted to that user. But when an administrator is using the same user system 750 to interact with MTS 700, the user system 750 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 700 that are allocated at the tenant level while other data structures are managed at the user level.

In some embodiments, a user system 750 and its components are configurable using applications, such as a browser, that include computer code executable on one or more processing elements. Similarly, in some embodiments, MTS 700 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 740 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 750 may communicate with MTS 700 using TCP/IP and, at a higher network level, use other common Internet protocols to communicate, such as HTTP, FTP, AFS, WAP, etc. For example, where HTTP is used, user system 750 might include an HTTP client commonly referred to as a "browser" for sending and receiving HTTP messages from an HTTP server at MTS 700. Such a server might be implemented as the sole network interface between MTS 700 and network 740, but other techniques might be used as well or instead. In some implementations, the interface between MTS 700 and network 740 includes load sharing functionality, such as round-robin HTTP request distributors to balance loads and distribute incoming HTTP requests evenly over a plurality of servers.

In various embodiments, user systems 750 communicate with application servers 722 to request and update system-level and tenant-level data from MTS 700 that may require one or more queries to data storage 712. In some embodiments, MTS 700 automatically generates one or more SQL statements (the SQL query) designed to access the desired information. In some cases, user systems 750 may generate requests having a specific format corresponding to at least a portion of MTS 700. As an example, user systems 750 may request to move data objects into a particular environment 724 using an object notation that describes an object relationship mapping (e.g., a JavaScript object notation mapping) of the specified plurality of objects.

Exemplary Computer System

Figure 8:
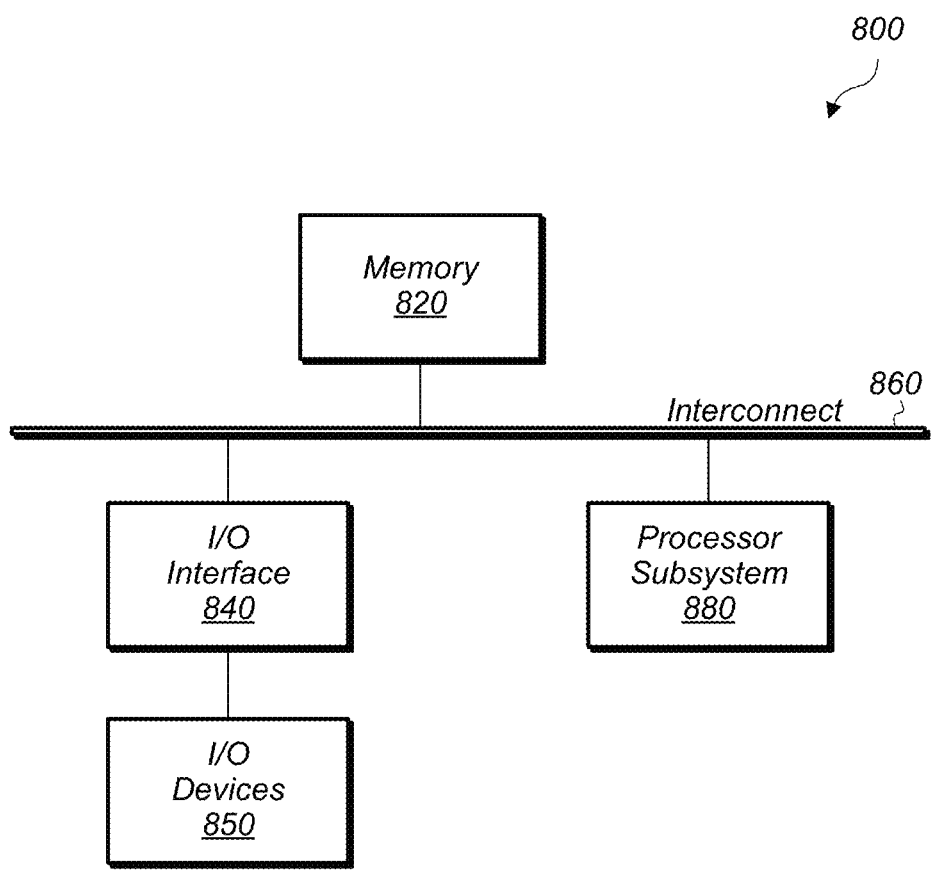
FIG. 8 is a block diagram illustrating an exemplary computer system, according to some embodiments.

Turning now to FIG. 8 a block diagram of an exemplary computer system 800, which may implement database system 10, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 1400 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, portions of database system 10 described above may include (or be included within) system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over Wi-Fi, Bluetooth, Ethernet, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3)

both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   receiving, by a server system, a query from a computer system;
   determining, by the server system, a set of aspects for the query, including at least a number of columns specified in the query and a computational cost of executing the query;
   generating, by the server system based on the set of aspects for the query, a query vector;
   comparing, by the server system, the query vector with a plurality of clusters, ones of the plurality of clusters comprising two or more previously generated query vectors generated based on aspects of queries previously received by the server system;
   classifying, by the server system based on the comparing, the query, wherein the classifying is based on a distance between the query vector and the plurality of clusters of previously generated query vectors; and
   managing, by the server system, the query based on a classification of the query determined during the classifying.

2. The method of claim 1, further comprising, prior to receiving the query from the computer system:
   generating, by the server system for a plurality of previously received queries, a plurality of query vectors, wherein generating the plurality of query vectors includes identifying two or more aspects for respective queries; and
   performing, by the server system, a clustering operation on the plurality of query vectors, wherein output of the clustering operation is the plurality of clusters of two or more of the plurality of query vectors representing the plurality of previously received queries.

3. The method of claim 2, further comprising:
   assigning, by the server system, query encodings located at a center of ones of the plurality of clusters as centroids of their respective cluster.

4. The method of claim 1, wherein the distance between the query vector and the plurality of clusters of previously generated query vectors is determined by:

measuring a Euclidean distance between the query vector and centroids of respective clusters of the plurality of clusters of previously generated query vector.

5. The method of claim 4, wherein the classifying includes assigning an anomalous classification to the query received from the computer system based on the query vector having a distance from the plurality of clusters that is greater than a distance threshold requirement.

6. The method of claim 1, wherein managing the query based on the classification of the query includes:
transmitting, by the server system to the computer system, an alert for the query, wherein the alert specifies the classification of the query and one or more preventative actions for the query.

7. The method of claim 1, wherein the managing includes rejecting the query received from the computer system, including transmitting a notification to the computer system indicating that the query is not authorized.

8. A non-transitory computer-readable medium having instructions stored thereon that are capable of causing a computing device to implement operations comprising:
receiving a query from a computer system;
determining a set of aspects for the query, including at least a number of tables specified in the query and a number of modifications specified in the query;
generating, based on the set of aspects for the query, a query vector;
comparing the query vector with a plurality of clusters, ones of the plurality of clusters comprising two or more of previously generated query vectors generated based on aspects of queries previously received by the computing device;
classifying, based on the comparing, the query, wherein the classifying is based on a distance between the query vector and the plurality of clusters of previously generated query vectors; and
managing the query based on a classification of the query determined during the classifying.

9. The non-transitory computer-readable medium of claim 8, wherein the operations further comprise, prior to receiving the query from the computer system:
generating, for a plurality of previously received queries, a plurality of query vectors, wherein generating the plurality of query vectors includes identifying two or more aspects for respective queries; and
performing a clustering operation on the plurality of query vectors, wherein output of the clustering operation is the plurality of clusters of two or more of the plurality of query vectors representing the plurality of previously received queries; and
assigning query encodings located at a center of ones of the plurality of clusters as centroids of their respective cluster.

10. The non-transitory computer-readable medium of claim 8, wherein determining the set of aspects for the query further includes determining a number of columns specified in the query and a computational cost of executing the query.

11. The non-transitory computer-readable medium of claim 8, wherein the managing includes:
transmitting, to the computer system, a request for one or more authentication factors; and
rejecting, based on a response from the computer system to the request for one or more authentication factors, the query.

12. The non-transitory computer-readable medium of claim 8, wherein the managing includes:

escalating one or more preventative actions based on the distance between the query vector and the plurality of clusters of previously generated query vectors, wherein the escalating includes performing more restrictive preventative actions for the query vector that is a greater distance from one or more of the plurality of clusters than preventative actions performed for another query vector that is a smaller distance from one or more of the plurality of clusters.

13. The non-transitory computer-readable medium of claim 8, wherein the distance between the query vector and the plurality of clusters of previously generated query vectors is determined by:
measuring, using cosine similarity, a distance between the query vector and centroids of respective clusters of the plurality of clusters of previously generated query vectors.

14. The non-transitory computer-readable medium of claim 8, wherein the managing includes:
transmitting, to the computer system from which the query was received, a notification requesting alteration of the query, wherein the notification specifies one or more deficiencies of the query corresponding to the requested alteration.

15. A system, comprising:
at least one processor; and
a memory having instructions stored thereon that are executable by the at least one processor to cause the system to:
receive a query from a computer system;
determine a set of aspects for the query, including at least a query type for the query and one or more table object identifiers referenced in the query;
generate, based on the set of aspects for the query, a query vector;
compare the query vector with a plurality of clusters, ones of the plurality of clusters comprising two or more of previously generated query vectors generated based on aspects of queries previously received by the system;
classify, based on the comparing, the query, wherein the classifying is based on a distance between the query vector and the plurality of clusters of previously generated query vectors; and
manage the query based on a classification of the query determined during the classifying.

16. The system of claim 15, wherein the instructions are further executable by the at least one processor to cause the system to, prior to receiving the query from the computer system:
generate, for a plurality of previously received queries, a plurality of query vectors, wherein generating the plurality of query vectors includes identifying two or more aspects for respective queries; and
perform a clustering operation on the plurality of query vectors, wherein output of the clustering operation is the plurality of clusters of two or more of the plurality of query vectors representing the plurality of previously received queries.

17. The system of claim 16, wherein the instructions are further executable by the at least one processor to cause the system to:
assign query encodings located at a center of ones of the plurality of clusters as centroids of their respective cluster.

18. The system of claim 15, wherein the classifying includes assigning an anomalous classification to the query received from the computer system based on the generated query vector having a distance from the plurality of clusters that is greater than a distance threshold requirement.

19. The system of claim 15, wherein the managing includes:
    transmitting, to the computer system, a request for one or more authentication factors; and
    determining whether to execute the query based on a response received from the computer system for the one or more authentication factors.

20. The system of claim 15, wherein the distance between the query vector and the plurality of clusters of previously generated query vectors is determined by:
    measuring, using an inner product algorithm, a distance between the query vector and centroids of respective clusters of the plurality of clusters of previously generated query vectors.

* * * * *

UNITED STATES PATENT AND TRADEMARK OFFICE
CERTIFICATE OF CORRECTION

PATENT NO. : 12,235,844 B1
APPLICATION NO. : 18/418991
DATED : February 25, 2025
INVENTOR(S) : Anup Ghatage et al.

Page 1 of 1

It is certified that error appears in the above-identified patent and that said Letters Patent is hereby corrected as shown below:

In the Claims

In Column 23 (Claim 4), Line 3, please delete "vector." and insert -- vectors. --.

Signed and Sealed this
First Day of April, 2025

Coke Morgan Stewart
*Acting Director of the United States Patent and Trademark Office*